United States Patent
Ishikawa et al.

(10) Patent No.: US 12,135,960 B2
(45) Date of Patent: Nov. 5, 2024

(54) CENTER, OTA MASTER, METHOD, NON-TRANSITORY STORAGE MEDIUM, AND VEHICLE

(71) Applicant: TOYOTA JIDOSHA KABUSHIKI KAISHA, Toyota (JP)

(72) Inventors: Tomoyasu Ishikawa, Nagoya (JP); Shunsuke Tanimori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 17/663,439

(22) Filed: May 16, 2022

(65) Prior Publication Data

US 2022/0405081 A1 Dec. 22, 2022

(30) Foreign Application Priority Data

Jun. 22, 2021 (JP) .................. 2021-103215

(51) Int. Cl.
*G06F 8/65* (2018.01)

(52) U.S. Cl.
CPC ..................... *G06F 8/65* (2013.01)

(58) Field of Classification Search
CPC ......................................... G06F 8/65
See application file for complete search history.

(56) References Cited

U.S. PATENT DOCUMENTS

| | | | |
|---|---|---|---|
| 9,524,160 B2 * | 12/2016 | Takahashi | G06F 13/00 |
| 10,203,947 B2 * | 2/2019 | Shiraishi | G06F 8/65 |
| 10,637,657 B2 * | 4/2020 | Haga | B60R 16/023 |
| 10,908,890 B2 * | 2/2021 | Nakamura | H04W 4/40 |
| 10,999,078 B2 * | 5/2021 | Kawabata | G06F 21/64 |
| 11,354,112 B2 * | 6/2022 | Noda | G06F 8/65 |
| 11,726,771 B2 * | 8/2023 | Nakatsukasa | G06F 8/656 717/168 |
| 11,861,354 B2 * | 1/2024 | Ishikawa | G06F 8/65 |
| 2009/0119657 A1 * | 5/2009 | Link, II | G06F 8/64 717/171 |
| 2009/0300596 A1 * | 12/2009 | Tyhurst | G06F 8/65 717/173 |

(Continued)

FOREIGN PATENT DOCUMENTS

JP 2004-326689 A 11/2004

*Primary Examiner* — Douglas M Slachta
(74) *Attorney, Agent, or Firm* — Oblon, McClelland, Maier & Neustadt, L.L.P.

(57) ABSTRACT

A center configured to communicate with an OTA master configured to control software update for an electronic control unit mounted on a vehicle, the center comprising includes one or more processors configured to generate a distribution package including update data of software of a target electronic control unit, first information, and second information. The first information is referenced by an external device connected to the vehicle by wire when the external device updates the software of the target electronic control unit via an in-vehicle network. The second information is referenced by the OTA master wirelessly connected to the center when the OTA master updates the software of the target electronic control unit via the in-vehicle network. The one or more processors are configured to transmit the distribution package to the OTA master based on a request from the OTA master.

9 Claims, 6 Drawing Sheets

(56) References Cited

U.S. PATENT DOCUMENTS

| | | | | |
|---|---|---|---|---|
| 2011/0320089 | A1* | 12/2011 | Lewis | H04L 67/34 380/278 |
| 2013/0121502 | A1* | 5/2013 | Fujii | H04R 27/00 381/77 |
| 2014/0173579 | A1* | 6/2014 | McDonald | G06F 8/65 717/172 |
| 2016/0105513 | A1* | 4/2016 | Bauman | H04L 12/4625 370/254 |
| 2016/0259639 | A1* | 9/2016 | Blaschke | G06F 8/65 |
| 2016/0378457 | A1* | 12/2016 | Adachi | H04L 63/0876 713/181 |
| 2018/0275983 | A1* | 9/2018 | Kwon | G06F 8/65 |
| 2019/0235855 | A1* | 8/2019 | Nakano | B60R 16/023 |
| 2020/0356356 | A1* | 11/2020 | Park | G06F 8/65 |
| 2021/0117177 | A1* | 4/2021 | Noda | B60R 16/0231 |
| 2021/0157492 | A1* | 5/2021 | Harata | G06F 3/0604 |
| 2021/0157575 | A1* | 5/2021 | Ogawa | G06F 8/654 |
| 2021/0309237 | A1* | 10/2021 | Sekiguchi | G06F 8/65 |
| 2022/0181012 | A1* | 6/2022 | Skelton | G16H 40/63 |
| 2022/0308857 | A1* | 9/2022 | Taki | B60W 50/00 |
| 2023/0004375 | A1* | 1/2023 | Adachi | G06F 13/00 |
| 2023/0095760 | A1* | 3/2023 | Go | H04L 67/34 717/171 |

* cited by examiner

CENTER, OTA MASTER, METHOD, NON-TRANSITORY STORAGE MEDIUM, AND VEHICLE

CROSS-REFERENCE TO RELATED APPLICATION

This application claims priority to Japanese Patent Application No. 2021-103215 filed on Jun. 22, 2021, incorporated herein by reference in its entirety.

BACKGROUND

1. Technical Field

The present disclosure relates to a center that controls software update of electronic control units, and relates to an over-the-air (OTA) master, a method, a non-transitory storage medium, and a vehicle.

2. Description of Related Art

Vehicles include a plurality of electronic control units configured to control operations of the vehicles. The electronic control unit includes a processor, a transitory storage unit such as a random-access memory (RAM), and a non-volatile memory that is a non-volatile storage unit such as a flash read-only memory (ROM). The processor implements control functions of the electronic control unit by executing software stored in the non-volatile memory. The software stored in each electronic control unit is rewritable. Updating to a newer version of the software enables improvement in the functions of the electronic control unit and addition of new vehicle control functions.

At a vehicle retailer or the like, the software of the electronic control unit can be updated or added by connecting an external device such as a diagnostic tool by wire to an in-vehicle network to which the electronic control unit is connected, and installing, into the electronic control unit, update software held in advance by the external device.

An over-the-air (OTA) technology is known as a technology for updating software of electronic control units. In the OTA technology, a device that handles a software update process for a vehicle is wirelessly connected both to an in-vehicle communication device connected to an in-vehicle network and to a communication network such as the Internet. The device that handles software update downloads software from a server through wireless communication and installs the downloaded software into the electronic control unit to update or add the software for the electronic control unit. For example, reference may be made to Japanese Unexamined Patent Application Publication No. 2004-326689 (JP 2004-326689 A).

SUMMARY

Communication schemes and conditions to be satisfied differ between the case of updating the software of the electronic control unit by using the external device connected to the in-vehicle network by wire and the case of updating the software of the electronic control unit by using the OTA technology (connecting wirelessly to the in-vehicle network). Therefore, when there is software update for the electronic control unit, it is necessary to create two types of distribution package that are a distribution package including data and information necessary for updating the software by wire and a distribution package including data and information necessary for updating the software by the OTA technology.

The present disclosure provides a center, an OTA master, a method, a non-transitory storage medium, and a vehicle that are capable of efficiently generating distribution packages.

A first aspect of the technology of the present disclosure relates to a center configured to communicate with an OTA master configured to control software update for an electronic control unit mounted on a vehicle. The center includes one or more processors. The one or more processors are configured to generate a distribution package including update data of software of a target electronic control unit, first information, and second information. The target electronic control unit is the electronic control unit to be updated. The first information is referenced by an external device connected to the vehicle by wire when the external device updates the software of the target electronic control unit via an in-vehicle network. The second information is referenced by the OTA master wirelessly connected to the center when the OTA master updates the software of the target electronic control unit via the in-vehicle network. The one or more processors are configured to transmit the distribution package to the OTA master based on a request from the OTA master.

In the center according to the first aspect of the technology of the present disclosure, the distribution package may further include identification information for determining which of the first information and the second information is to be referenced by the external device and the OTA master.

A second aspect of the technology of the present disclosure relates to an OTA master configured to control software update for an electronic control unit mounted on a vehicle. The OTA master includes one or more processors. The one or more processors are configured to receive, from a center, a distribution package including update data of software of a target electronic control unit, first information, and second information. The target electronic control unit is the electronic control unit to be updated. The first information is referenced by an external device connected to the vehicle by wire when the external device updates the software of the target electronic control unit via an in-vehicle network. The second information is referenced by the OTA master wirelessly connected to the center when the OTA master updates the software of the target electronic control unit via the in-vehicle network. The one or more processors are configured to control software update for the target electronic control unit based on the update data and the second information.

In the OTA master according to the second aspect of the technology of the present disclosure, the distribution package may further include identification information indicating which of the first information and the second information is to be referenced by the external device and the OTA master. The one or more processors may be configured to determine the second information based on the identification information.

A third aspect of the technology of the present disclosure relates to a method to be executed by a center configured to communicate with an OTA master configured to control software update for an electronic control unit mounted on a vehicle. The OTA master includes one or more processors and a memory. The method includes generating a distribution package including update data of software of a target electronic control unit, first information, and second information. The target electronic control unit is the electronic control unit to be updated. The first information is referenced by an external device connected to the vehicle by wire when the external device updates the software of the target electronic control unit via an in-vehicle network. The second information is referenced by the OTA master wirelessly connected to the center when the OTA master updates the software of the target electronic control unit via the in-vehicle network. The method includes transmitting the distribution package to the OTA master based on a request from the OTA master.

A fourth aspect of the technology of the present disclosure relates to a method to be executed by an OTA master configured to control software update for an electronic control unit mounted on a vehicle. The OTA master includes one or more processors and a memory. The method includes receiving, from a center, a distribution package including update data of software of a target electronic control unit, first information, and second information. The target electronic control unit is the electronic control unit to be updated. The first information is referenced by an external device connected to the vehicle by wire when the external device updates the software of the target electronic control unit via an in-vehicle network. The second information is referenced by the OTA master wirelessly connected to the center when the OTA master updates the software of the target electronic control unit via the in-vehicle network. The method includes controlling software update for the target electronic control unit based on the update data and the second information.

A fifth aspect of the technology of the present disclosure relates to a non-transitory storage medium storing instructions that are executable by one or more computers of a center and that cause the one or more computers of the center to perform functions. The center is configured to communicate with an OTA master configured to control software update for an electronic control unit mounted on a vehicle. The OTA master includes one or more processors and a memory. The functions include generating a distribution package including update data of software of a target electronic control unit, first information, and second information. The target electronic control unit is the electronic control unit to be updated. The first information is referenced by an external device connected to the vehicle by wire when the external device updates the software of the target electronic control unit via an in-vehicle network. The second information is referenced by the OTA master wirelessly connected to the center when the OTA master updates the software of the target electronic control unit via the in-vehicle network. The functions include transmitting the distribution package to the OTA master based on a request from the OTA master.

A sixth aspect of the technology of the present disclosure relates to a non-transitory storage medium storing instructions that are executable by one or more computers of an OTA master and that cause the one or more computers of the OTA master to perform functions. The OTA master is configured to control software update for an electronic control unit mounted on a vehicle. The OTA master includes one or more processors and a memory. The functions include receiving, from a center, a distribution package including update data of software of a target electronic control unit, first information, and second information. The target electronic control unit is the electronic control unit to be updated. The first information is referenced by an external device connected to the vehicle by wire when the external device updates the software of the target electronic control unit via an in-vehicle network. The second information is referenced by the OTA master wirelessly connected to the center when the OTA master updates the software of the target electronic control unit via the in-vehicle network. The functions include controlling software update for the target electronic control unit based on the update data and the second information.

The OTA master according to the second aspect of the technology of the present disclosure may be mounted on a vehicle.

According to the center, the OTA master, the method, the non-transitory storage medium, and the vehicle of the present disclosure, it is possible to generate the distribution package that can be referenced both by the external device connected to the vehicle by wire and by the OTA master wirelessly connected to the center. Therefore, the distribution package can be generated efficiently.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

In the present disclosure, a distribution package, that can be referenced both by an external device connected to a vehicle by wire and by an OTA master wirelessly connected to a center, is generated. As a result, there is no need to create two types of distribution package that are a distribution package including data and information necessary for updating software by wire and a distribution package including data and information necessary for updating the software by OTA. Thus, the distribution package can be generated efficiently.

An embodiment of the present disclosure will be described below in detail with reference to the drawings.

Embodiment

Configuration

Figure 1:
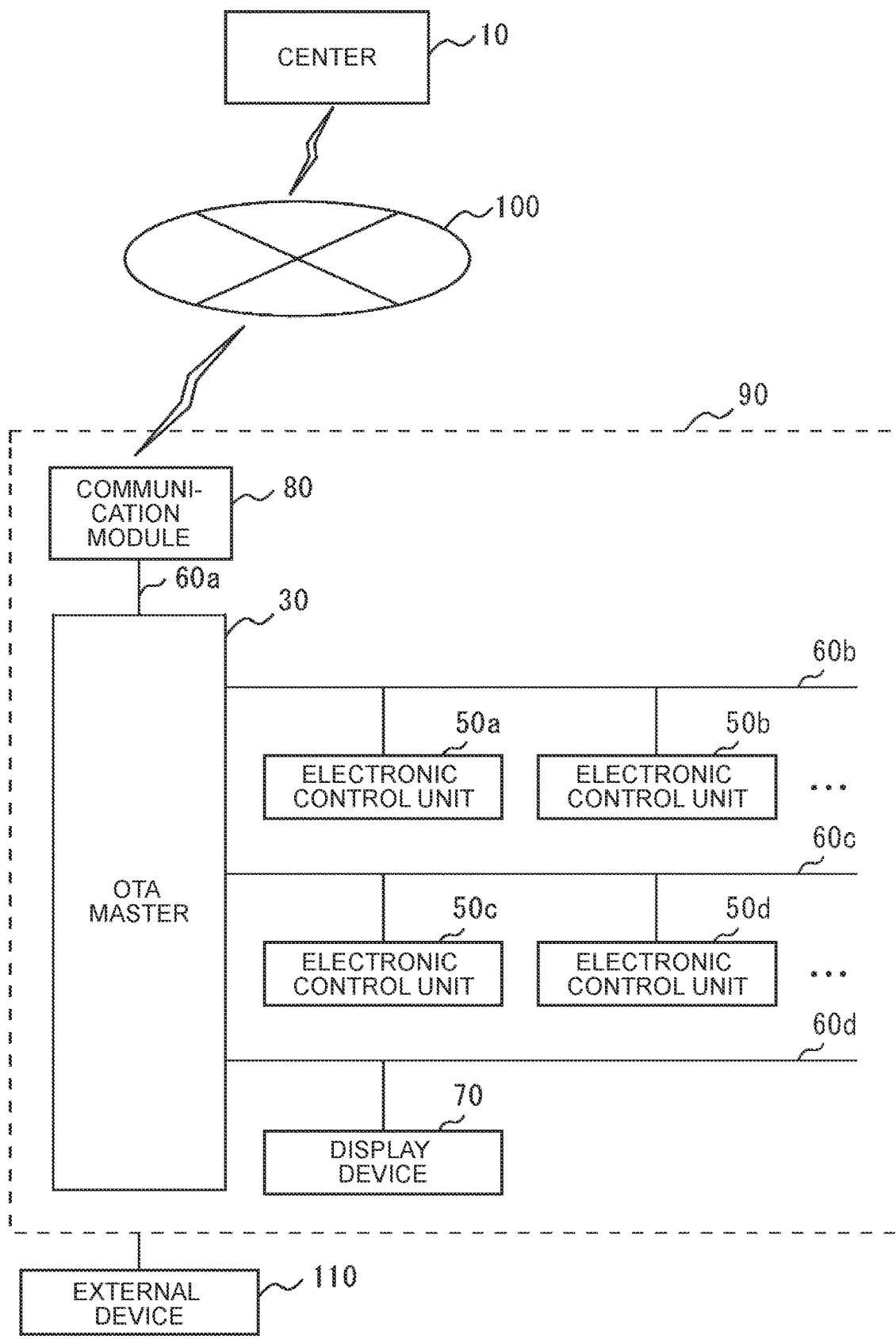
FIG. 1 is a block diagram showing an overall configuration of a network system according to an embodiment.

FIG. 1 is a block diagram showing an overall configuration of a network system according to the embodiment of the present disclosure. The network system shown in FIG. 1 is a system for updating software of a plurality of electronic control units 50a to 50d mounted on a vehicle. The network system includes a center 10 and an external device 110 that are outside the vehicle, an in-vehicle network 90 constructed inside the vehicle, and a network 100.

(1) Center

The center 10 is wirelessly communicable, via the network 100, with an OTA master 30 described later in the in-vehicle network 90. The center 10 transmits software update data of the electronic control units 50a to 50d to the OTA master 30 and receives a notification about progress of a software update process from the OTA master 30. The center 10 can control and manage the software update of the electronic control units 50a to 50d connected to the OTA master 30. The center 10 has functions of a so-called server.

Figure 2:
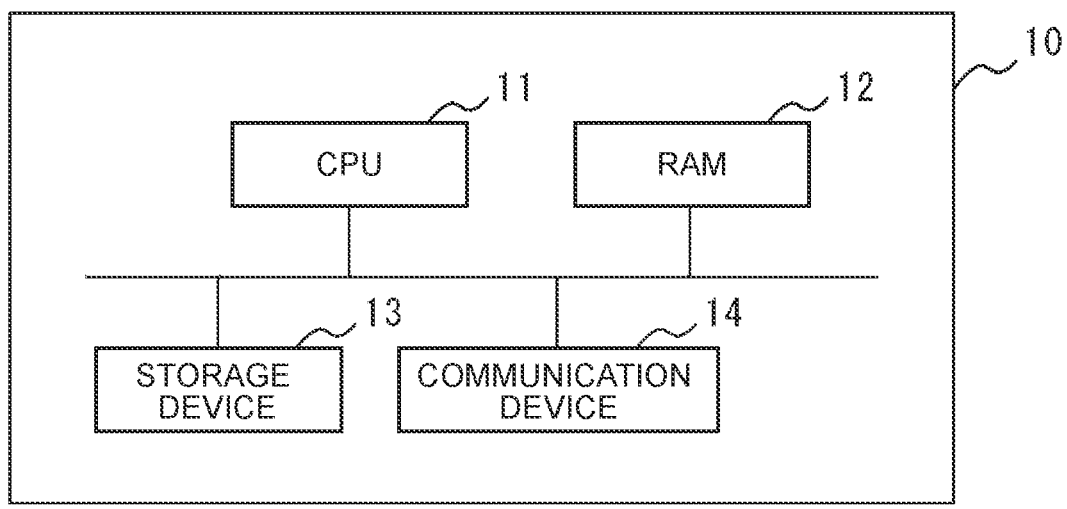
FIG. 2 is a block diagram showing a schematic configuration of a center.

FIG. 2 is a block diagram showing a schematic configuration of the center 10 in FIG. 1. As shown in FIG. 2, the center 10 includes a central processing unit (CPU) 11, a random-access memory (RAM) 12, a storage device 13, and a communication device 14. The storage device 13 includes a readable/writable storage medium such as a hard disk drive (HDD) or a solid state drive (SSD). For example, the storage device 13 stores programs for executing software update management, information to be used for the software update management, and update data of each electronic control unit. In the center 10, the CPU 11 executes the program read from the storage device 13 by using the RAM 12 as a work area to execute a predetermined process related to software update. The communication device 14 communicates with the OTA master 30 via the network 100.

Figure 3:
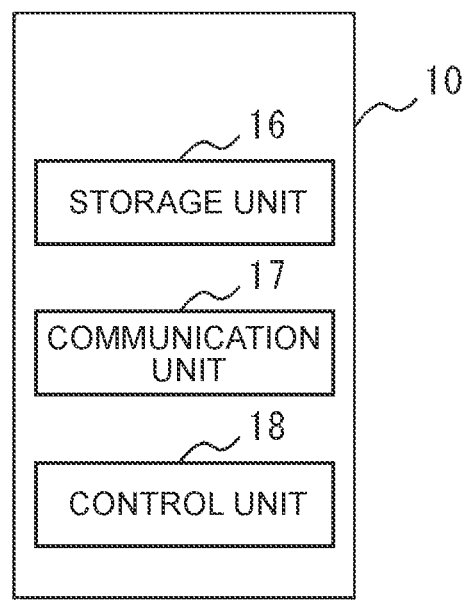
FIG. 3 is a functional block diagram of the center.

FIG. 3 is a functional block diagram of the center 10 shown in FIG. 2. The center 10 shown in FIG. 3 includes a storage unit 16, a communication unit 17, and a control unit 18. The storage unit 16 is implemented by the storage device 13 shown in FIG. 2. The communication unit 17 and the control unit 18 are implemented by the CPU 11 in FIG. 2 executing the programs stored in the storage device 13 by using the RAM 12.

The storage unit 16 stores information related to the software update process of one or more electronic control units mounted on the vehicle. As the information related to the software update process, the storage unit 16 stores at least update management information and software update data of the electronic control units 50a to 50d. The update management information is information in which information indicating software available for the electronic control units 50a to 50d is associated with vehicle identification information (vehicle ID) for identifying the vehicle. Examples of the information indicating software available for the electronic control units 50a to 50d include a combination of pieces of latest version information of software products of the electronic control units 50a to 50d. As the information related to the software update process, the storage unit 16 can also store a status of the software update being executed in the vehicle. The storage unit 16 can further store information (described later) related to the type of a non-volatile memory mounted on each of the electronic control units 50a to 50d.

The communication unit 17 functions as a transmission unit and a reception unit that transmit and receive data, information, requests, or the like to and from the OTA master 30. The communication unit 17 receives a software update check request from the OTA master 30 (reception unit). For example, the update check request is transmitted from the OTA master 30 to the center 10 when power supply or ignition is turned ON (hereinafter referred to as "powered ON") in the vehicle. The update check request is information for requesting the center 10 to check whether there is update data of the electronic control units 50a to 50d based on vehicle configuration information described later. In response to the update check request received from the OTA master 30, the communication unit 17 transmits information indicating the presence or absence of update data to the OTA master 30 (transmission unit). The communication unit 17 also receives a distribution package transmission request (download request) from the OTA master 30 (reception unit). In response to the reception of the distribution package download request, the communication unit 17 transmits, to the OTA master 30, a distribution package of the software update data of the electronic control units 50a to 50d that is generated by the control unit 18 described later.

When the communication unit 17 receives the update check request from the OTA master 30, the control unit 18 determines whether there is software update data for the electronic control units 50a to 50d mounted on the vehicle identified by the vehicle ID included in the update check request based on the update management information stored in the storage unit 16. A result of the determination made by the control unit 18 as to whether there is update data is transmitted to the OTA master 30 by the communication unit 17. When the control unit 18 determines that there is software update data for the electronic control units 50a to 50d and receives a distribution package download request from the OTA master 30, the control unit 18 generates a distribution package of the corresponding update data stored in the storage unit 16.

The control unit 18 generates a distribution package including at least software update data for the electronic control unit that is a target of software update (hereinafter referred to as "target electronic control unit"), external device information (example of "first information"), and OTA master information (example of "second information"). The external device information is referenced when the external device 110 connected to the vehicle by wire updates the software of the target electronic control unit via the in-vehicle network 90. The external device information defines, for example, conditions to be determined when the external device 110 updates the software of the target electronic control unit, a unit of transfer of the update data to the target electronic control unit, and an action to be taken when an error occurs. The OTA master information is referenced when the OTA master 30 wirelessly connected to the center 10 updates the software of the target electronic control unit via the in-vehicle network 90. The OTA master information defines, for example, conditions to be determined when the OTA master 30 updates the software of the target electronic control unit, a unit of transfer of the update data to the target electronic control unit, and an action to be taken when an error occurs.

Figure 4:
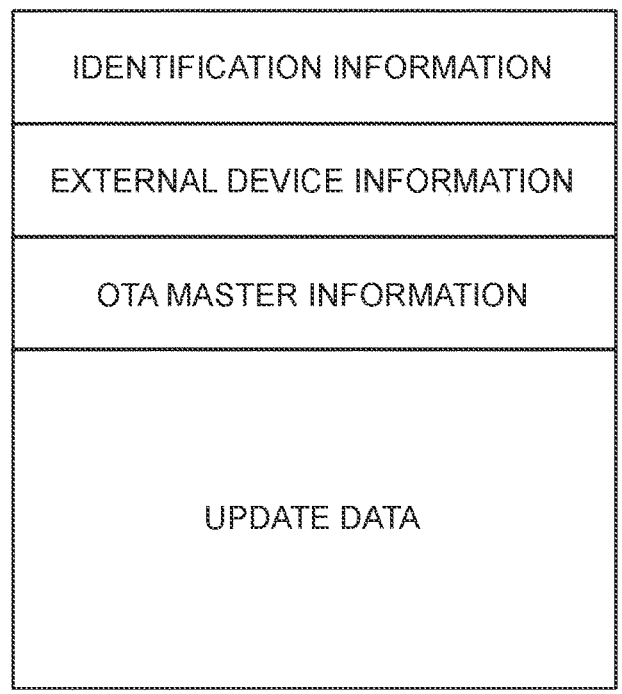
FIG. 4 shows an example of a distribution package to be generated by the center.

FIG. 4 shows an example of the distribution package to be generated by the control unit 18. The distribution package illustrated in FIG. 4 includes identification information (flag or the like) in addition to the update data, the external device information, and the OTA master information. The identification information is information for determining information (information location) to be referenced by the external device 110 or the OTA master 30 that has acquired the distribution package. The identification information may be omitted when an information reference destination address in the distribution package is predetermined in the external device 110 or the OTA master 30. Although FIG. 4 shows an example in which one piece of update data to be shared by the external device 110 and the OTA master 30 is packaged, update data for the external device 110 and update data for the OTA master 30 may separately be generated into distribution packages.

(2) External Device

The external device 110 communicates with the vehicle by being connected by wire to a communication interface such as a connector (not shown) provided in the vehicle. Examples of the external device 110 include a service tool that transmits data necessary for software update to the electronic control units 50a to 50d connected to the in-vehicle network 90 or performs so-called diagnostic communication for self-diagnosis of the vehicle in a maintenance shop or a dealer. The external device 110 can communicate with the center 10 via a predetermined network. The external device 110 can acquire a distribution package generated by the center 10. The external device may include a CPU, a RAM, a ROM, a storage device, and a communication device similarly to the OTA master 30. The communication device of the external device may communicate with the center 10 via a predetermined network.

(3) In-Vehicle Network

The in-vehicle network 90 includes the OTA master 30, the electronic control units 50a to 50d, a display device 70, and a communication module 80. The OTA master 30 and the communication module 80 are connected via a bus 60a. The OTA master 30 and the electronic control units 50a and 50b are connected via a bus 60b. The OTA master 30 and the electronic control units 50c and 50d are connected via a bus 60c. The OTA master 30 and the display device 70 are connected via a bus 60d.

The OTA master 30 can wirelessly communicate with the center 10 via the bus 60a, the communication module 80, and the network 100. The OTA master 30 can also communicate with the electronic control units 50a to 50d and the display device 70 by wire via the buses 60b to 60d. The OTA master 30 is a device having a function of managing an OTA status (status of software update control using wireless communication connection to the center 10), controlling an update sequence that is a flow of the software update process, and updating the software of the target electronic control unit to be updated. The OTA master 30 controls the software update of the target electronic control unit among the electronic control units 50a to 50d based on, for example, the update data acquired from the center 10 through the wireless communication. The OTA master 30 may also be referred to as "central gateway (CGW)". One or more target electronic control units 50a to 50d may function as the OTA master 30.

Figure 5:
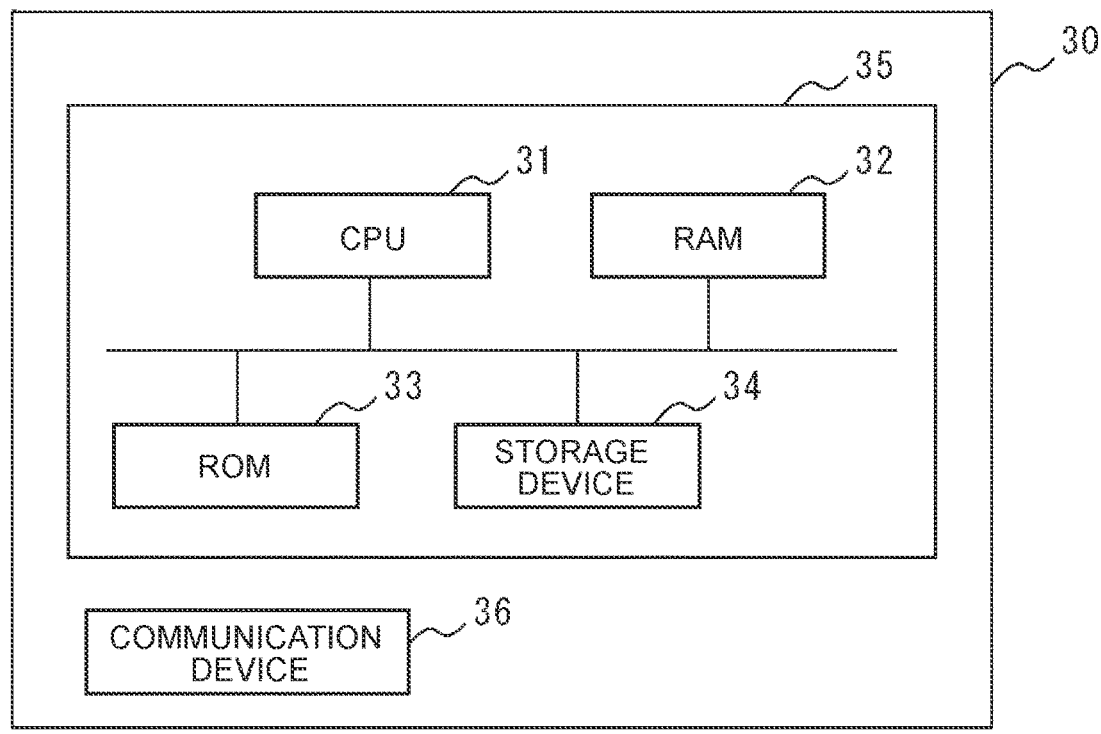
FIG. 5 is a block diagram showing a schematic configuration of an OTA master.

FIG. 5 is a block diagram showing a schematic configuration of the OTA master 30 in FIG. 1. As shown in FIG. 5, the OTA master 30 includes a CPU 31, a RAM 32, a read-only memory (ROM) 33, a storage device 34, and a communication device 36. The CPU 31, the RAM 32, the ROM 33, and the storage device 34 constitute a microcomputer 35. In the OTA master 30, the CPU 31 executes a program read from the ROM 33 by using the RAM 32 as a work area to execute a predetermined process related to software update. The communication device 36 communicates with the communication module 80, the electronic control units 50a to 50d, and the display device 70 via the buses 60a to 60d shown in FIG. 1.

Figure 6:
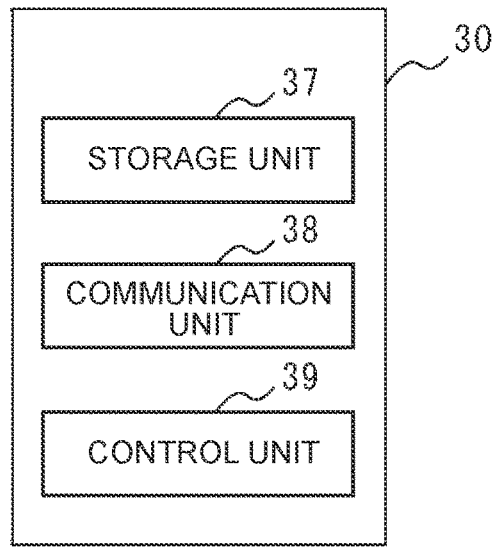
FIG. 6 is a functional block diagram of the OTA master.

FIG. 6 is a functional block diagram of the OTA master 30 shown in FIG. 5. The OTA master 30 shown in FIG. 6 includes a storage unit 37, a communication unit 38, and a control unit 39. The storage unit 37 is implemented by the storage device 34 shown in FIG. 5. The communication unit 38 and the control unit 39 are implemented by the CPU 31 in FIG. 5 executing programs stored in the ROM 33 by using the RAM 32.

The storage unit 37 stores, for example, a program for executing software update of the electronic control units 50a to 50d (control program for the OTA master 30), various types of data to be used when executing the software update, and software update data downloaded in the form of a distribution package from the center 10.

The communication unit 38 functions as a transmission unit and a reception unit that transmit and receive data, information, requests, or the like to and from the center 10. For example, the communication unit 38 transmits a software update check request to the center 10 when the vehicle is powered ON (transmission unit). For example, the update check request includes the vehicle ID for identifying the vehicle, and information related to current software versions of the electronic control units 50a to 50d connected to the in-vehicle network 90. The vehicle ID and the current software versions of the electronic control units 50a to 50d are used to determine whether there is software update data for the electronic control units 50a to 50d by making comparison with the latest software versions stored in the center 10 for each vehicle ID. The communication unit 38 receives a notification about the presence or absence of update data from the center 10 as a response to the update check request (reception unit). When there is software update data for the electronic control units 50a to 50d, the communication unit 38 transmits a download request for a distribution package including the software update data to the center 10 (transmission unit). The communication unit 38 receives (downloads) the distribution package transmitted from the center 10 (reception unit). The communication unit 38 transmits, to the center 10, software update statuses received from the electronic control units 50a to 50d (transmission unit).

The control unit 39 determines whether there is software update data for the electronic control units 50a to 50d based on the response to the update check request that is received from the center 10 by the communication unit 38. The control unit 39 verifies authenticity of the distribution package received (downloaded) from the center 10 by the communication unit 38 and stored in the storage unit 37. The control unit 39 controls the software update process (various types of verification, installation, activation, or the like) of the electronic control units 50a to 50d by using the update data received (downloaded) from the center 10. Specifically, the control unit 39 transfers one or more pieces of update data downloaded in the distribution package to the target electronic control unit, and causes the target electronic control unit to install update software based on the update data. After the installation is completed, the control unit 39 instructs the target electronic control unit to activate, that is, enable the installed update software.

The electronic control units 50a to 50d are devices (ECUs) configured to control operations of individual parts of the vehicle. Although the four electronic control units 50a to 50d are exemplified in FIG. 1, the number of electronic control units is not particularly limited. The number of buses connecting the electronic control units to the OTA master 30 is not particularly limited as well.

The display device 70 is a human-machine interface (HMI) to be used for various types of display such as display of information indicating that there is update data during the software update process of the electronic control units 50a to 50d, display of an acceptance request screen for requesting acceptance of the user or administrator of the vehicle for the software update, and display of a result of the software update. A typical example of the display device 70 is a display device of a car navigation system. The display device 70 is not particularly limited as long as the display device 70 can display information necessary for the software update process. An electronic control unit or the like may further be connected to the bus 60*d* shown in FIG. 1 in addition to the display device 70.

The communication module 80 is a unit having a function of controlling communication between the center 10 and the vehicle, and is a communication device for connecting the in-vehicle network 90 to the center 10. The communication module 80 is wirelessly connected to the center 10 via the network 100. For example, the OTA master 30 authenticates the vehicle and downloads update data via the communication module 80. The communication module 80 may be included in the OTA master 30.

Overview of Software Update Process

For example, the OTA master 30 transmits a software update check request to the center 10 when the vehicle is powered ON. The update check request includes the vehicle ID for identifying the vehicle, and the vehicle configuration information. The vehicle configuration information is information related to conditions of the electronic control units (system configuration), such as hardware and current software versions of the electronic control units 50*a* to 50*d* connected to the in-vehicle network 90. The vehicle configuration information can be created by acquiring identification numbers of the electronic control units (ECU_IDs) and identification numbers of the software versions of the electronic control units (ECUSoftware_IDs) from the electronic control units 50*a* to 50*d* connected to the in-vehicle network 90. The vehicle ID and the current software versions of the electronic control units 50*a* to 50*d* are used to determine whether there is software update data for the electronic control units 50*a* to 50*d* by making comparison with the latest software versions held in the center 10 for each vehicle ID. In response to the update check request received from the OTA master 30, the center 10 transmits a notification about the presence or absence of update data to the OTA master 30. When there is software update data for the electronic control units 50*a* to 50*d*, the OTA master 30 transmits a distribution package download request to the center 10. In response to the download request received from the OTA master 30, the center 10 transmits a distribution package of the update data to the OTA master 30. The distribution package may include, in addition to the update data, the external device information, and the OTA master information described above, verification data for verifying the authenticity of the update data, the number of pieces of the update data, type information, and various types of control information to be used during software update.

The OTA master 30 determines whether there is software update data for the electronic control units 50*a* to 50*d* based on the response to the update check request that is received from the center 10. The OTA master 30 verifies the authenticity of the distribution package received from the center 10 and stored in the storage device 34. The OTA master 30 transfers one or more pieces of update data downloaded in the distribution package to the target electronic control unit, and causes the target electronic control unit to install the update data (update software). After the installation is completed, the OTA master 30 instructs the target electronic control unit to enable the installed updated version of software.

In an acceptance request process, the OTA master 30 causes an output device to output a notification that acceptance is required for software update, and a notification that prompts the user to input acceptance for the software update. Examples of the output device include the display device 70 provided in the in-vehicle network 90 and an audio output device that provides notifications by voice or sound. For example, when the display device 70 is used as the output device in the acceptance request process, the OTA master 30 is capable of causing the display device 70 to display an acceptance request screen for requesting acceptance of the user or administrator for the software update, and to display a notification that prompts the user or administrator to perform a specific input operation such as pressing of an acceptance button when the user or administrator accepts the software update. In the acceptance request process, the OTA master 30 is capable of causing the display device 70 to display texts, icons, or the like for notifying that there is software update data for the electronic control units 50*a* to 50*d*, and to display restrictions during the execution of the software update process. In response to reception of the input of acceptance from the user or administrator, the OTA master 30 executes a control process for the installation and activation of the update software described above to update the software of the target electronic control unit.

When the non-volatile memory of the electronic control unit is a single-bank memory having one storage area for storing the control program and the update data, the installation and activation are executed in succession. Therefore, the acceptance request process for the software update is executed before the installation. When the non-volatile memory of the electronic control unit is a dual-bank memory having two storage areas for storing the control program and the update data, the installation and activation need not be executed in succession. Therefore, the acceptance request process for the software update is executed at least after the installation and before the activation. When the non-volatile memory of the electronic control unit is the dual bank memory, the acceptance request process for the software update before the installation may be executed or omitted.

The software update process includes a download phase, an installation phase, and an activation phase. In the download phase, the OTA master 30 downloads (receives) update data from the center 10. In the installation phase, the OTA master 30 transfers the downloaded update data to the target electronic control unit and installs (writes) update software based on the update data in the storage area of the target electronic control unit. In the activation phase, the target electronic control unit activates (enables) the installed update software.

Download is a process in which the OTA master 30 receives the software update data for the electronic control units 50*a* to 50*d* that is transmitted from the center 10 in the form of the distribution package and stores the update data in the storage device 34. The download phase includes not only the execution of download, but also control of a series of processes related to the download, such as determination of whether the download can be executed, request for acceptance of the user or administrator of the vehicle for the download, and verification of the updated data.

The update data transmitted from the center 10 to the OTA master 30 may include update software for the electronic control units 50*a* to 50*d* (whole data or difference data), compressed data of the update software, or divided data of the update software or the compressed data. The update data may include an ECU_ID (or serial number) of the target electronic control unit and an ECU. Software_ID of the electronic control unit before update. The update data is downloaded as the distribution package. The distribution package includes update data for one or more electronic control units.

Installation is a process in which the OTA master 30 writes the update software (updated version program) to the target electronic control unit based on the update data downloaded from the center 10. The installation phase includes not only the execution of installation, but also control of a series of processes related to the installation, such as determination of whether the installation can be executed, request for acceptance of the user or administrator of the vehicle for the installation, transfer of the update data, and verification of the update software.

When the update data includes the update software (whole data), the OTA master 30 transfers the update data (update software) to the target electronic control unit in the installation phase. When the update data includes compressed data, difference data, or divided data of the update software, the OTA master 30 may transfer the update data to the target electronic control unit and the target electronic control unit may generate the update software from the update data. Alternatively, the OTA master 30 may generate the update software from the update data and then transmit the update software to the target electronic control unit. The update software can be generated by decompressing the compressed data or assembling (integrating) the difference data or the divided data.

The update software can be installed by the target electronic control unit based on an installation request (or instruction) from the OTA master 30 (or the center 10). The target electronic control unit that has received the update data may autonomously execute the installation without receiving an explicit instruction from the OTA master 30.

Activation is a process in which the target electronic control unit enables (activates) the installed update software. The activation phase includes not only the execution of activation, but also a series of controls related to the activation, such as determination of whether the activation can be executed, request for acceptance of the user or administrator of the vehicle for the activation, and verification of an execution result.

The update software can be activated by the target electronic control unit based on an activation request (or instruction) from the OTA master 30 (or the center 10). The target electronic control unit that has received the update data may autonomously execute the activation after completion of the installation without receiving an explicit instruction from the OTA master 30.

The software update process can be performed successively or in parallel on a plurality of target electronic control units.

The "software update process" herein includes not only a process of successively executing all of the download, installation, and activation, but also a process of executing only a part of the download, installation, and activation.

Processes

Next, processes to be executed in the network system according to the present embodiment will be described with reference to FIGS. 7, 8, and 9 as well.

Figure 7:
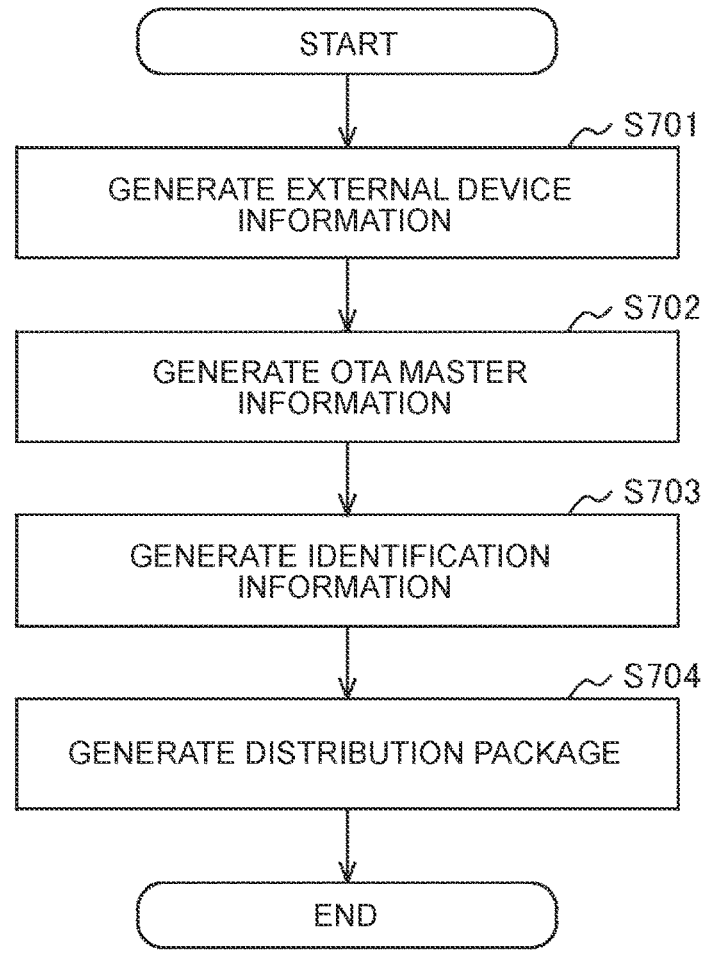
FIG. 7 is a flowchart of a distribution package generation process to be executed by the center.

FIG. 7 is a flowchart illustrating a processing procedure according to a specific example of a distribution package generation process to be executed by the control unit 18 of the center 10. The distribution package generation process illustrated in FIG. 7 is started, for example, by the occurrence of a campaign that is an event for updating the software of the vehicle.

Step S701

The control unit 18 of the center 10 generates external device information. The external device information is referenced when the external device 110 updates the software of the target electronic control unit via the in-vehicle network 90. The external device information defines, for example, conditions to be determined when the external device 110 updates the software of the target electronic control unit, a unit of transfer of the update data to the target electronic control unit, and an action to be taken when an error occurs. When the external device information is generated, the process proceeds to Step S702.

Step S702

The control unit 18 of the center 10 generates OTA master information. The OTA master information is referenced when the OTA master 30 updates the software of the target electronic control unit. The OTA master information defines, for example, conditions to be determined when the OTA master 30 updates the software of the target electronic control unit, a unit of transfer of the update data to the target electronic control unit, and an action to be taken when an error occurs. When the OTA master information is generated, the process proceeds to Step S703.

Step S703

The control unit 18 of the center 10 generates identification information. The identification information is referenced by the external device 110 and the OTA master 30. The identification information is information for determining locations of the external device information and the OTA master information included in a distribution package together with the update data. When the locations of the pieces of information to be referenced by the external device 110 and the OTA master 30 are known in advance, the generation of the identification information in Step S703 can be omitted. When the identification information is generated, the process proceeds to Step S704.

Step S704

The control unit 18 of the center 10 generates a distribution package including the update data, the external device information, and the OTA master information and further including the identification information if it is generated. Thus, the distribution package generation process is terminated.

Figure 8:
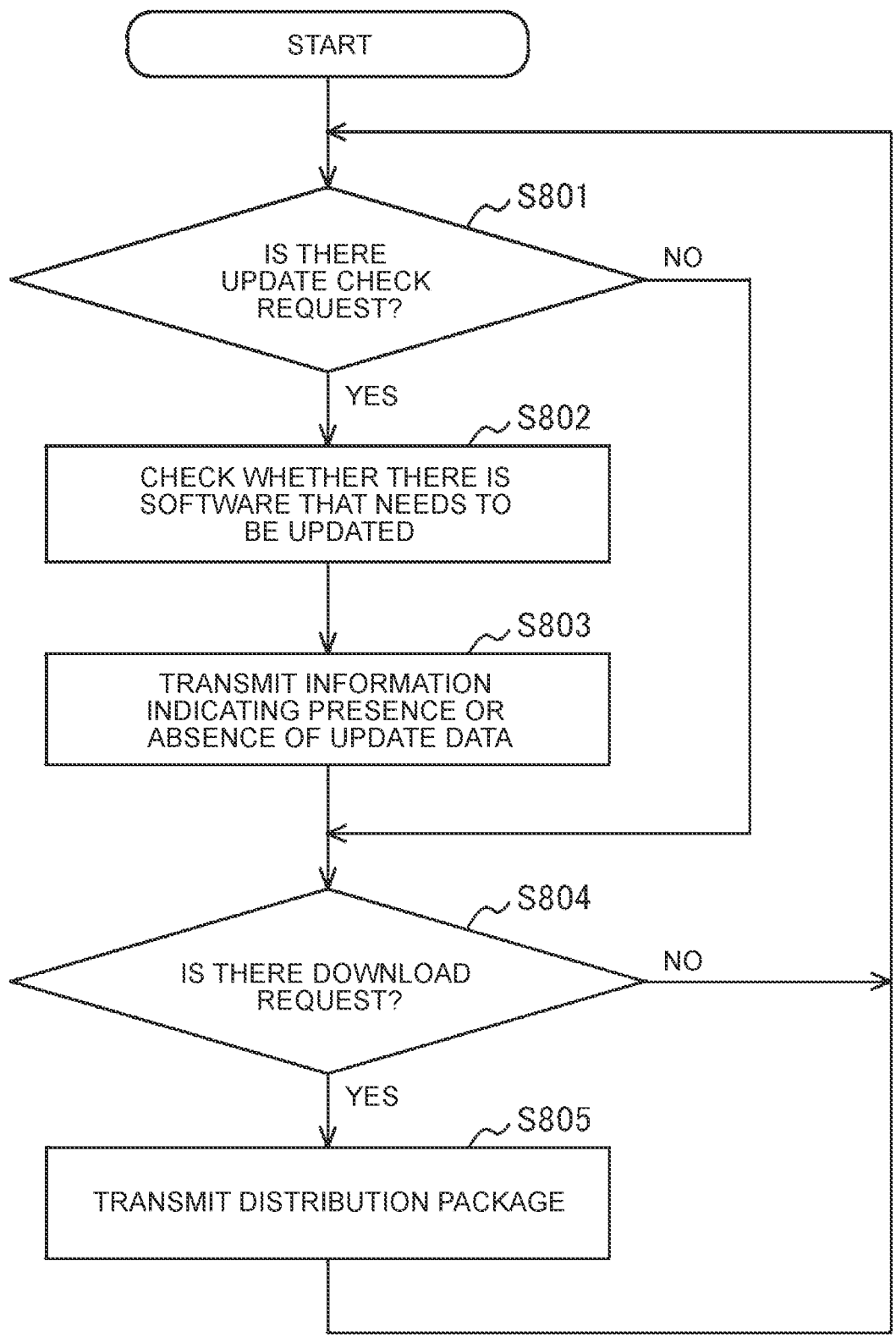
FIG. 8 is a flowchart of a distribution control process to be executed by the center.

FIG. 8 is a flowchart illustrating an example of a distribution control process to be executed by the individual components of the center 10. The distribution control process shown in FIG. 8 is started when the center 10 receives an update check request transmitted by the OTA master 30.

Step S801

The communication unit 17 of the center 10 determines whether there is a software update check request from the OTA master 30. When there is an update check request (Step S801: YES), the process proceeds to Step S802. When there is no update check request (Step S801: NO), the process proceeds to Step S804.

Step S802

The control unit 18 of the center 10 checks whether there is software that needs to be updated. This check is made by comparing current software versions of the electronic control units 50*a* to 50*d* on the vehicle that are acquired from the vehicle configuration information in the update check request and the latest software versions stored in the storage unit 16 of the center 10. When the check is made as to whether there is software that needs to be updated, the process proceeds to Step S803.

Step S803

The control unit 18 of the center 10 determines whether there is software update data for the electronic control units 50*a* to 50*d* mounted on the vehicle in the update check request based on the update management information stored in the storage unit 16 of the center 10. Based on a determination result, the control unit 18 transmits information indicating the presence or absence of update data to the OTA master 30. When the information indicating the presence or absence of update data is transmitted, the process proceeds to Step S804.

Step S804

The communication unit 17 of the center 10 determines whether there is a distribution package download request from the OTA master 30. When there is a download request (Step S804: YES), the process proceeds to Step S805. When there is no download request (Step S804: NO), the process proceeds to Step S801.

Step S805

The communication unit 17 of the center 10 transmits the distribution package to the OTA master 30. When the distribution package is transmitted, the process proceeds to Step S801.

Figure 9:
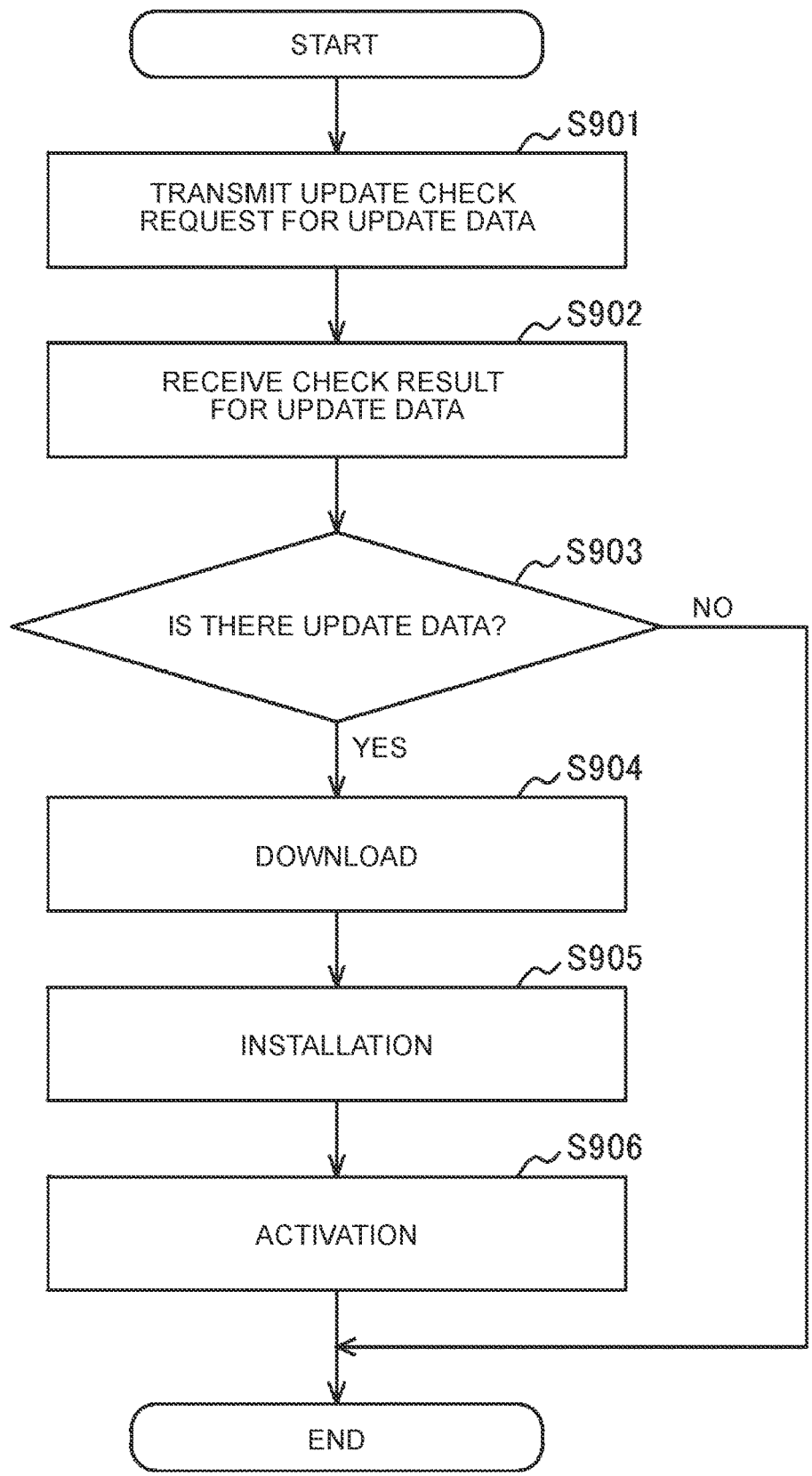
FIG. 9 is a flowchart of a software update control process to be executed by the OTA master.

FIG. 9 is a flowchart illustrating an example of a software update control process to be executed by the individual components of the OTA master 30. For example, the software update control process shown in FIG. 9 is executed when the vehicle is powered ON.

Step S901

The communication unit 38 of the OTA master 30 transmits, to the center 10, an update check request as to whether there is software update data for the electronic control units 50a to 50d. This update check request includes the vehicle ID and current software versions of the electronic control units 50a to 50d. When the update check request is transmitted to the center 10, the process proceeds to Step S902.

Step S902

The communication unit 38 of the OTA master 30 receives, from the center 10, a response to the update check request (check result for update data). When the response to the update check request is received, the process proceeds to Step S903.

Step S903

The control unit 39 of the OTA master 30 determines whether there is software update data for at least one of the electronic control units 50a to 50d based on the response to the update check request for the update data that is received by the communication unit 38 of the OTA master 30. When there is at least one piece of software update data (Step S903: YES), the process proceeds to Step S904. When there is no software update data (Step S903: NO), the software update control process is terminated.

Step S904

The control unit 39 of the OTA master 30 downloads the update data. More specifically, the communication unit 38 of the OTA master 30 transmits a download request for a distribution package including the update data to the center 10, and receives a distribution package transmitted from the center 10 in response to the download request. The communication unit 38 stores the received distribution package in the storage unit 37 of the OTA master 30. When the update data is downloaded, the process proceeds to Step S905.

Step S905

The control unit 39 of the OTA master 30 executes software installation for the target electronic control unit based on the update data. More specifically, the control unit 39 transfers the update data in the distribution package to the target electronic control unit based on the OTA master information (determinable by the identification information) in the distribution package, and instructs the target electronic control unit to install update software. The target electronic control unit writes the update data received from the OTA master 30 to the data storage area. When the update software is installed, the process proceeds to Step S906.

Step S906

The control unit 39 of the OTA master 30 activates the update software installed in the target electronic control unit. More specifically, the control unit 39 instructs the target electronic control unit that has written the update software to the data storage area included to activate the update software based on the OTA master information in the distribution package. The target electronic control unit is restarted and executes the update software when a specific input operation such as powering OFF is performed. When the activation process for the update software is executed, the software update control process is terminated.

The details of the software update control in the software update using the OTA master 30 (software update using the OTA master 30 wirelessly connected to the in-vehicle network) have been described above with reference to FIGS. 8 and 9. Software update control using an external device connected to the in-vehicle network by wire is performed in the same manner. In the software update control using the external device, the distribution control process shown in FIG. 8 and the software update control process shown in FIG. 9 may be started when the external device is connected to the connector of the vehicle. In the software update control using the external device, the external device transfers, in Step S905, the update data in the distribution package to the target electronic control unit based on the external device information (determinable by the identification information) in the distribution package, and instructs the target electronic control unit to install the update software. In Step S906, the external device instructs the target electronic control unit that has written the update software to the data storage area to activate the update software based on the external device information in the distribution package.

Effects

As described above, the network system according to the embodiment of the present disclosure generates the distribution package that can be referenced both by the external device connected to the vehicle by wire and by the OTA master wirelessly connected to the center. As a result, there is no need to create two types of distribution package that are a distribution package including data and information necessary for updating software by wire and a distribution package including data and information necessary for updating the software by OTA. Thus, the distribution package can be generated efficiently.

Since the distribution package including the update data includes the information (identification information) for identifying the information to be referenced by the OTA master (OTA master information), the software of the electronic control unit can be updated by OTA using the distribution package common to the OTA master and the external device.

Although the embodiment of the technology of the present disclosure has been described above, the present disclosure can be understood not only as the center but also as, for example, a distribution control method to be executed by a center including a processor, a memory, and a storage device, a distribution control program, or a non-transitory computer-readable storage medium storing the distribution control program. The OTA master may include one or more processors. The center may include one or more processors.

The technology of the present disclosure can be used in a network system for updating software of an electronic control unit.

What is claimed is:

1. A center configured to communicate with an over-the-air (OTA) master configured to control software update for an electronic control unit mounted on a vehicle, the center comprising one or more processors configured to:
generate a distribution package configured for providing both a wired software update and a wireless software update depending on a connection being used, the distribution package including update data of software of a target electronic control unit, first information, and second information, the target electronic control unit being the electronic control unit to be updated, the first information being specifically for a wired software update and defining a setting that is used when an external device updates the software of the target electronic control unit via an in-vehicle network, the second information being specifically for a wireless software update and defining a setting that is used when the OTA master updates the software of the target electronic control unit via the in-vehicle network; and
transmit the distribution package to the OTA master based on a request from the OTA master.

2. The center according to claim 1, wherein the distribution package further includes identification information for determining which of the first information and the second information is to be referenced by the external device and the OTA master.

3. An over-the-air (OTA) master configured to control software update for an electronic control unit mounted on a vehicle, the OTA master comprising one or more processors configured to:
receive, from a center, a distribution package configured for providing both a wired software update capability and a wireless software update capability depending on a connection being used, the distribution package including update data of software of a target electronic control unit, first information, and second information, the target electronic control unit being the electronic control unit to be updated, the first information being specifically for a wired software update and defining a setting that is used when an external device updates the software of the target electronic control unit via an in-vehicle network, the second information being specifically for a wireless software update and defining a setting that is used when the OTA master updates the software of the target electronic control unit via the in-vehicle network; and
control software update for the target electronic control unit based on the update data and the second information.

4. The OTA master according to claim 3, wherein:
the distribution package further includes identification information indicating which of the first information and the second information is to be referenced by the external device and the OTA master; and
the one or more processors are configured to determine the second information based on the identification information.

5. A method to be executed by a center configured to communicate with an over-the-air (OTA) master configured to control software update for an electronic control unit mounted on a vehicle, the OTA master including one or more processors and a memory, the method comprising:
generating a distribution package configured for providing both a wired software update capability and a wireless software update capability depending on a connection being used, the distribution package including update data of software of a target electronic control unit, first information, and second information, the target electronic control unit being the electronic control unit to be updated, the first information being specifically for a wired software update and defining a setting that is when an external device updates the software of the target electronic control unit via an in-vehicle network, the second information being specifically for a wireless software update and defining a setting that is used when the OTA master updates the software of the target electronic control unit via the in-vehicle network; and
transmitting the distribution package to the OTA master based on a request from the OTA master.

6. A method to be executed by an over-the-air (OTA) master configured to control software update for an electronic control unit mounted on a vehicle, the OTA master including one or more processors and a memory, the method comprising:
receiving, from a center, a distribution package configured for providing both a wired software update capability and a wireless software update capability depending on a connection being used, the distribution package including update data of software of a target electronic control unit, first information, and second information, the target electronic control unit being the electronic control unit to be updated, the first information being specifically fora wired software update and defining a setting that is used when an external device updates the software of the target electronic control unit via an in-vehicle network, the second information being specifically for a wireless software update and defining a setting that is used when the OTA master updates the software of the target electronic control unit via the in-vehicle network; and
controlling software update for the target electronic control unit based on the update data and the second information.

7. A non-transitory storage medium storing instructions that are executable by one or more computers of a center and that cause the one or more computers of the center to perform functions, the center being configured to communicate with an over-the-air (OTA) master configured to control software update for an electronic control unit mounted on a vehicle, the OTA master including one or more processors and a memory, the functions comprising:
generating a distribution package configured for providing both a wired software update capability and a wireless software update capability depending on a connection being used, the distribution package including update data of software of a target electronic control unit, first information, and second information, the target electronic control unit being the electronic control unit to be updated, the first information being specifically for a wired software update and defining a setting that is used when an external device updates the software of the target electronic control unit via an in-vehicle network, the second information being specifically for a wireless software update and defining a setting that is used when the OTA master updates the software of the target electronic control unit via the in-vehicle network; and
transmitting the distribution package to the OTA master based on a request from the OTA master.

8. A non-transitory storage medium storing instructions that are executable by one or more computers of an over-the-air (OTA) master and that cause the one or more computers of the OTA master to perform functions, the OTA master being configured to control software update for an electronic control unit mounted on a vehicle, the OTA master including one or more processors and a memory, the functions comprising:
    receiving, from a center, a distribution package configured for providing both a wired software update capability and a wireless software update capability depending on a connection being used, the distribution package including update data of software of a target electronic control unit, first information, and second information, the target electronic control unit being the electronic control unit to be updated, the first information being specifically for a wired software update and defining a setting that is used when an external device updates the software of the target electronic control unit via an in-vehicle network, the second information being specifically for a wireless software update and defining a setting that is used when the OTA master updates the software of the target electronic control unit via the in-vehicle network; and
    controlling software update for the target electronic control unit based on the update data and the second information.

9. A vehicle comprising the OTA master according to claim 3.

\* \* \* \* \*